US010620683B2

(12) United States Patent
Yeo et al.

(10) Patent No.: US 10,620,683 B2
(45) Date of Patent: Apr. 14, 2020

(54) SYSTEM AND METHOD FOR REPRESENTING POWER SYSTEM INFORMATION

(71) Applicant: SCHNEIDER ELECTRIC USA, INC., Andover, MA (US)

(72) Inventors: Jeffrey W. Yeo, Saanichton (CA); Peter Tovey, Kelowna (CA); James Pettit, Victoria (CA); Avro Anthony Sargeaunt Nelson, Victoria (CA); Shannon Schubert, Victoria (CA); Peter Smith, Victoria (CA); Mark Anthony Mary Swinkels, Victoria (CA); Timothy Robert Ducharme, Victoria (CA)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 0 days.

(21) Appl. No.: 15/851,932

(22) Filed: Dec. 22, 2017

(65) Prior Publication Data

US 2018/0341313 A1 Nov. 29, 2018

Related U.S. Application Data

(63) Continuation of application No. 14/909,371, filed as application No. PCT/US2013/053463 on Aug. 2, 2013, now abandoned.

(51) Int. Cl.
*G06F 1/32* (2019.01)
*G06F 1/3206* (2019.01)
(Continued)

(52) U.S. Cl.
CPC .......... *G06F 1/3206* (2013.01); *H02J 13/001* (2013.01); *H02J 3/00* (2013.01);
(Continued)

(58) Field of Classification Search
CPC . G06F 1/3206; H02J 13/001; H02J 2003/007; H02J 3/00; Y02E 60/76; Y04S 10/40; Y04S 40/22
See application file for complete search history.

(56) References Cited

U.S. PATENT DOCUMENTS 8,238,080 B2  8/2012  McGinn
8,321,163 B2  11/2012  Ewing et al.
(Continued)

FOREIGN PATENT DOCUMENTS

WO   2012040515 A1   3/2012
WO   2013/089782 A2   6/2013
WO   2014109776 A1   7/2014

OTHER PUBLICATIONS

Extended European Search Report from corresponding European Application No. 13890756.3 dated Feb. 1, 2017.

(Continued)

*Primary Examiner* — Abdelmoniem I Elamin
(74) *Attorney, Agent, or Firm* — Lando & Anastasi, LLP

(57) ABSTRACT

A system for representing power system information to a user includes a processor configured to receive data descriptive of logical elements including data descriptive of a first logical element and a second logical element, receive data descriptive of devices including data descriptive of a first device, receive data descriptive of measured characteristics of the devices including data descriptive of a first measured characteristic of the first device, receive data mapping the first device to the first logical element for a first period of time, receive data mapping the first device to the second logical element for a second period of time, receive data requesting at least one summary value for the first logical element over a period of time spanning the first period of (Continued)

time and the second period of time, calculate, in response to receiving the data requesting the at least one summary value.

19 Claims, 9 Drawing Sheets

(51) Int. Cl.
   *H02J 13/00* (2006.01)
   *H02J 3/00* (2006.01)

(52) U.S. Cl.
   CPC ......... *H02J 2003/007* (2013.01); *Y02E 60/76* (2013.01); *Y04S 10/40* (2013.01); *Y04S 40/22* (2013.01)

(56) References Cited

U.S. PATENT DOCUMENTS

| | | | |
|---|---|---|---|
| 8,880,910 B2 | 11/2014 | Jai | |
| 8,954,763 B2* | 2/2015 | German | H04Q 1/136 |
| | | | 713/300 |
| 9,037,881 B2 | 5/2015 | Mathew et al. | |
| 9,047,074 B2* | 6/2015 | Pfeifer | G06F 1/266 |
| 9,141,154 B2 | 9/2015 | Champion et al. | |
| 9,500,682 B1 | 11/2016 | Morales et al. | |
| 9,723,379 B2* | 8/2017 | German | H04Q 1/136 |
| 10,061,371 B2* | 8/2018 | Geffin | G06F 1/206 |
| 2003/0125886 A1* | 7/2003 | Spitaels | H02J 3/14 |
| | | | 702/62 |
| 2010/0102633 A1* | 4/2010 | Seaton | H02J 9/06 |
| | | | 307/64 |
| 2012/0078680 A1 | 3/2012 | Tharp | |
| 2012/0198246 A1* | 8/2012 | German | H04Q 1/136 |
| | | | 713/300 |
| 2012/0331311 A1 | 12/2012 | Jai | |
| 2013/0238795 A1* | 9/2013 | Geffin | G06F 1/206 |
| | | | 709/224 |
| 2014/0108827 A1 | 4/2014 | Mathew et al. | |
| 2015/0051749 A1* | 2/2015 | Hancock | G06Q 50/06 |
| | | | 700/295 |
| 2015/0143153 A1* | 5/2015 | German | H04Q 1/136 |
| | | | 713/324 |
| 2016/0094426 A1 | 3/2016 | Myrah et al. | |
| 2016/0172900 A1 | 6/2016 | Welch, Jr. | |

OTHER PUBLICATIONS

Garbrecht, S. D., "The Benefits of Component Object-Based SCADA and Supervisory System Application Development," Invensys, Wonderware, Part No. 15-0162; Mar. 2006, pp. 1-16.

Notification of Transmittal of the International Search Report and Written Opinon of the International Searching Authority from corresponding PCT/US2013/053463 dated Feb. 12, 2014.

* cited by examiner

View 1

Group by: PDU ▼ — 302

My Datacentre — 102
- -PDU_1 — 304a
  - -RPP_1 — 306a
    - -Panel_1 — 308a
      - Circuit_1 — 106a
      - Circuit_2 — 106b
      - Circuit_3 — 106c
      - Circuit_4 — 106d
      - Circuit_5 — 106e
      - Circuit_6 — 106f
      - Circuit_7 — 106g
      - Circuit_8 — 106h
    - +Panel_2 — 308b
  - -RPP_2 — 306b
    - +Panel_3 — 308c
    - +Panel_4 — 308d
  - -RPP_3 — 306c
    - Panel_5 — 308e
    - Panel_6 — 308f
  - +RPP_4 — 306d 300a

View 2

Group by: Rack ▼ — 302

My Datacentre — 102
- -Rack_1 — 104a
  - Circuit_1 — 106a
  - Circuit_2 — 106b
- -Rack_2 — 104b
  - Circuit_3 — 106c
  - Circuit_4 — 106d
- -Rack_3 — 104c
  - Circuit_5 — 106e
  - Circuit_6 — 106f
- -Rack_4 — 104d
  - Circuit_7 — 106g
  - Circuit_8 — 106h
- -Rack_5 — 104e
  - Circuit_9 — 106i
  - Circuit_10 — 106j
- +Rack_6 — 104f
- +Rack_7 — 104g
- +Rack_8 — 104h 300b

View 3

Group by: Tenant ▼ — 302

My Datacentre — 102
- -Tenant_1 — 108a
  - -Rack_1 — 104a
    - Circuit_1 — 106a
    - Circuit_2 — 106b
  - -Rack_2 — 104b
    - Circuit_3 — 106c
    - Circuit_4 — 106d
- -Tenant_2 — 108b
  - +Rack_3 — 104c
  - +Rack_4 — 104d
  - +Rack_5 — 104e
  - +Rack_6 — 104f
- -Tenant_3 — 108c
  - +Rack_7 — 104g
  - +Rack_8 — 104h
  - +Rack_9 — 104i
  - +Rack_10 — 104j
- +Tenant_4 — 108d
- +Tenant_5 — 108e
- +Tenant_6 — 108f 300c

| Panel | ▼ RPP | Property 1 | Property 2 |
|---|---|---|---|
| Name | | | |
| Panel_1 | RPP_1 | Val~618a | Val~620a |
| Panel_2 | RPP_1 | Val~618b | Val~620b |
| Panel_3 | RPP_2 | Val~618c | Val~620c |
| Panel_4 | RPP_2 | Val 618d | Val |
| Panel_5 | RPP_3 | Val~618e | Val~620d 620e |
| Panel_6 | RPP_3 | Val | Val |
| Panel_7 | RPP_4 | Val | Val |
| Panel_8 | RPP_4 | Val | Val |
| Panel_9 | RPP_5 | Val | Val |
| Panel_10 | RPP_5 | Val | Val |
| Panel_11 | RPP_6 | Val | Val |
| Panel_12 | RPP_6 | Val | Val |
| Panel_13 | | | |
| Panel_14 | | | |
| Panel_15 | | | |
| Panel_16 | Val | Val | |
| Panel_17 | Val | Val | |

Tabs: Summary, PDUs, RPPs, Panels, Circuits, Racks, Tenants

Buttons: New, Delete

SYSTEM AND METHOD FOR REPRESENTING POWER SYSTEM INFORMATION

CROSS-REFERENCE TO RELATED APPLICATIONS

This application is a continuation of U.S. patent application Ser. No. 14/909,371, titled SYSTEM AND METHOD FOR REPRESENTING POWER SYSTEM INFORMATION, now abandoned, which is a U.S. National Stage Application and claims priority under 35 U.S.C. § 371 from International Application No. PCT/US2013/053463, filed Aug. 2, 2013, titled SYSTEM AND METHOD FOR REPRESENTING POWER SYSTEM INFORMATION, both of which are hereby incorporated herein by reference in their entirety.

BACKGROUND

Field of Invention

Aspects disclosed herein relate to systems and methods for representing power system information to a user via a user interface.

Discussion of Related Art

In response to the increasing demands of information-based economies, information technology networks continue to proliferate across the globe. This expansion has taken on various forms including widely distributed computer networks, which link together geographically disparate computing resources, and centralized network datacenters, which provide shared power, cooling and telecommunication infrastructure to a host of collocated network devices. As the kind, size and complexity of these information technology networks grow, so do the costs associated with their operation. These costs include the cost of acquiring network devices and infrastructure, the cost of the power consumed by the network devices and cooling systems, and the salary of network administration staff.

As the magnitude of the costs associated with information technology networks has increased, so has the market's focus on enabling organizations to better manage them. Buildings, datacenters, and other physical facilities include power consuming equipment such as lighting, air conditioning, and racks holding multiple servers or other computer equipment. Space and equipment within these facilities may be rented to multiple tenants to conduct business. Managers of these facilities track power usage. Accurate modeling of power usage provides information on resource use and availability.

SUMMARY OF INVENTION

Aspects and examples disclosed herein a system for representing power system information to a user. The system comprises a memory, and at least one processor coupled to the memory. The at the least one processor is configured to receive data descriptive of a plurality of logical elements including data descriptive of a first logical element and a second logical element, the first logical element being different from the second logical element, receive data descriptive of a plurality of devices including data descriptive of a first device, receive data descriptive of a plurality of measured characteristics of the plurality of devices including data descriptive of a first measured characteristic of the first device, receive data mapping the first device to the first logical element for a first period of time, receive data mapping the first device to the second logical element for a second period of time different from the first period of time, receive data requesting at least one summary value for the first logical element over a period of time spanning the first period of time and the second period of time, calculate, in response to receiving the data requesting the at least one summary value, at least one first summary for the first logical element using one or more values of the first measured characteristic recorded during the first period of time and not using one or more values of the first measured characteristic recorded during the second period of time, and provide the first summary in association with the first logical element.

According to one embodiment, the data descriptive of the plurality of devices includes data descriptive of a second device different from the first device, the data descriptive of the plurality of measured characteristics includes data descriptive of a second measured characteristic of the second device. The least one processor is further configured to receive data mapping the second device to the first logical element for the second period of time, receive data mapping the second device to the second logical element for the first period of time, receive data requesting at least one summary value for the second logical element over a period of time spanning the first period of time and the second period of time, calculate, in response to receiving the data requesting the at least one summary value for the second logical element, at least one second summary for the second logical element using one or more values of the second measured characteristic recorded during the first period of time and using the one or more values of the first measured characteristic recorded during the second period of time, and provide the second summary in association with the second logical element.

According to one embodiment, the data descriptive of the plurality of logical elements includes data descriptive of a third logical element different from the first logical element and the second logical element. The at least one processor is further configured to receive data linking the first logical element and the second logical element to the third logical element, receive data requesting at least one summary value for the third logical element over a period of time spanning the first period of time and the second period of time, calculate, in response to receiving the data requesting the at least one summary value for the third logical element, at least one third summary for the third logical element using the one or more values of the first measured characteristic recorded during the first period of time, using the one or more values of the first measured characteristic recorded during the second period of time, using the one or more values of the second measured characteristic recorded during the first period of time, and using one or more values of the second measured characteristic recorded during the second period of time, and provide the third summary in association with the third logical element.

According to one embodiment, the at least one processor is configured to provide the third summary in association with the third logical element within a view, the view including the third logical element in connection with the second logical element and the first logical element. According to one embodiment, the devices include power system devices. According to one embodiment, the devices include meters, the first logical element and the second logical element represent circuits, and the third logical element represents a rack. According to one embodiment, the first measured characteristic and the second measured characteristic include power consumed, the first summary and the second summary include total power consumed, and the third summary includes total cost of power consumed.

According to one aspect, a computer implemented method for providing information regarding a power system comprising power system elements is provided. The method comprises receiving, via an interface, data descriptive of a plurality of logical elements including data descriptive of a first logical element and a second logical element, the first logical element being different from the second logical element, receiving data descriptive of a plurality of devices including data descriptive of a first device, receiving data descriptive of a plurality of measured characteristics of the plurality of devices including data descriptive of a first measured characteristic of the first device, receiving data mapping the first device to the first logical element for a first period of time, receiving data mapping the first device to the second logical element for a second period of time different from the first period of time, receiving data requesting at least one summary value for the first logical element over a period of time spanning the first period of time and the second period of time, calculating, in response to receiving the data requesting the at least one summary value, at least one first summary for the first logical element using one or more values of the first measured characteristic recorded during the first period of time and not using one or more values of the first measured characteristic recorded during the second period of time, and presenting, via the interface, the first summary in association with the first logical element.

According to one embodiment, the data descriptive of the plurality of devices includes data descriptive of a second device different from the first device, the data descriptive of the plurality of measured characteristics includes data descriptive of a second measured characteristic of the second device. In this embodiment, the method further comprises receiving data mapping the second device to the first logical element for the second period of time, receiving data mapping the second device to the second logical element for the first period of time, receiving data requesting at least one summary value for the second logical element over a period of time spanning the first period of time and the second period of time, calculating, in response to receiving the data requesting the at least one summary value for the second logical element, at least one second summary for the second logical element using one or more values of the second measured characteristic recorded during the first period of time and using the one or more values of the first measured characteristic recorded during the second period of time, and presenting, via the interface, the second summary in association with the second logical element.

According to one embodiment, the data descriptive of the plurality of logical elements includes data descriptive of a third logical element different from the first logical element and the second logical element. In this embodiment, the method further comprises, receiving data linking the first logical element and the second logical element to the third logical element, receiving data requesting at least one summary value for the third logical element over a period of time spanning the first period of time and the second period of time, calculating, in response to receiving the data requesting the at least one summary value for the third logical element, at least one third summary for the third logical element using the one or more values of the first measured characteristic recorded during the first period of time, using the one or more values of the first measured characteristic recorded during the second period of time, using the one or more values of the second measured characteristic recorded during the first period of time, and using one or more values of the second measured characteristic recorded during the second period of time, and presenting, via the interface, the third summary in association with the third logical element.

According to one embodiment, presenting the third summary in association with the third logical element includes presenting the third summary in association with the third logical element within a view, the view including the third logical element in connection with the second logical element and the first logical element. According to one embodiment, the plurality of devices include a plurality of power system devices and wherein receiving data descriptive of the plurality of devices includes receiving data descriptive of the plurality of power system devices. According to one embodiment, receiving the data descriptive of a plurality of devices includes receiving data descriptive of a plurality of meters, receiving the data mapping the first device to the first logical element includes receiving data identifying a circuit, receiving the data mapping the first device to the second logical element includes receiving data identifying the circuit, and receiving data linking the first logical element and the second logical element to the third logical element includes receiving data identifying a rack.

According to one embodiment, receiving data descriptive of the first measure characteristic includes receiving data descriptive of power consumed, receiving data descriptive of the second characteristic includes receiving data descriptive of power consumed, presenting the first summary includes presenting a total power consumed, presenting the second summary includes presenting a total power consumed, and presenting the third summary includes presenting a total cost of power consumed.

According to one aspect, a non-transitory computer readable medium storing computer readable instructions that, when executed by at least one processor, instruct the at least one processor to perform a method of providing information regarding a power system comprising power system elements is provided. The method comprises receiving, via an interface, data descriptive of a plurality of logical elements including data descriptive of a first logical element and a second logical element, the first logical element being different from the second logical element, receiving data descriptive of a plurality of devices including data descriptive of a first device, receiving data descriptive of a plurality of measured characteristics of the plurality of devices including data descriptive of a first measured characteristic of the first device, receiving data mapping the first device to the first logical element for a first period of time, receiving data mapping the first device to the second logical element for a second period of time different from the first period of time, receiving data requesting at least one summary value for the first logical element over a period of time spanning the first period of time and the second period of time, calculating, in response to receiving the data requesting the at least one summary value, at least one first summary for the first logical element using one or more values of the first measured characteristic recorded during the first period of time and not using one or more values of the first measured characteristic recorded during the second period of time, and presenting, via the interface, the first summary in association with the first logical element.

According to one embodiment, the data descriptive of the plurality of devices includes data descriptive of a second device different from the first device, the data descriptive of the plurality of measured characteristics includes data descriptive of a second measured characteristic of the second device. In this embodiment, the method further comprises receiving data mapping the second device to the first logical element for the second period of time, receiving data mapping the second device to the second logical element for the first period of time, receiving data requesting at least one summary value for the second logical element over a period of time spanning the first period of time and the second period of time, calculating, in response to receiving the data requesting the at least one summary value for the second logical element, at least one second summary for the second logical element using one or more values of the second measured characteristic recorded during the first period of time and using the one or more values of the first measured characteristic recorded during the second period of time, and presenting, via the interface, the second summary in association with the second logical element.

According to one embodiment, the data descriptive of the plurality of logical elements includes data descriptive of a third logical element different from the first logical element and the second logical element. In this embodiment, the method further comprises, receiving data linking the first logical element and the second logical element to the third logical element, receiving data requesting at least one summary value for the third logical element over a period of time spanning the first period of time and the second period of time, calculating, in response to receiving the data requesting the at least one summary value for the third logical element, at least one third summary for the third logical element using the one or more values of the first measured characteristic recorded during the first period of time, using the one or more values of the first measured characteristic recorded during the second period of time, using the one or more values of the second measured characteristic recorded during the first period of time, and using one or more values of the second measured characteristic recorded during the second period of time, and presenting, via the interface, the third summary in association with the third logical element.

According to one embodiment, presenting the third summary in association with the third logical element includes presenting the third summary in association with the third logical element within a view, the view including the third logical element in connection with the second logical element and the first logical element. According to one embodiment, the plurality of devices include a plurality of power system devices and wherein receiving data descriptive of the plurality of devices includes receiving data descriptive of the plurality of power system devices. According to one embodiment, receiving the data descriptive of a plurality of devices includes receiving data descriptive of a plurality of meters, receiving the data mapping the first device to the first logical element includes receiving data identifying a circuit, receiving the data mapping the first device to the second logical element includes receiving data identifying the circuit, and receiving data linking the first logical element and the second logical element to the third logical element includes receiving data identifying a rack.

According to one embodiment, receiving data descriptive of the first measure characteristic includes receiving data descriptive of power consumed, receiving data descriptive of the second characteristic includes receiving data descriptive of power consumed, presenting the first summary includes presenting a total power consumed, presenting the second summary includes presenting a total power consumed, and presenting the third summary includes presenting a total cost of power consumed.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the invention. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 3 is a screenshot of example user interfaces;
FIG. 6 is a screenshot of an example user interface.

DETAILED DESCRIPTION

Aspects and examples disclosed herein relate to apparatus and processes for representing power systems. Power systems can include device elements, which can include devices that provide, use, and/or generate power and devices that measure characteristics of other power system elements. Power systems can also include logical elements, which can include people, places, entities, and objects having a relationship to other power system elements, as well as groupings of other device elements and/or logical elements. The power system can be represented in various views, each showing a hierarchy of relationships between various device elements and logical elements. The relationships can also be used to summarize measured characteristics of the device elements and associate the measured characteristics with device elements and logical elements. The relationships and elements can include time components so that the measured characteristics can be shown based on requested elements and time ranges. For example, power usage can be measured and the relationships can be used to determine the power usage of a room of a building or a tenant of a datacenter for a given period of time.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
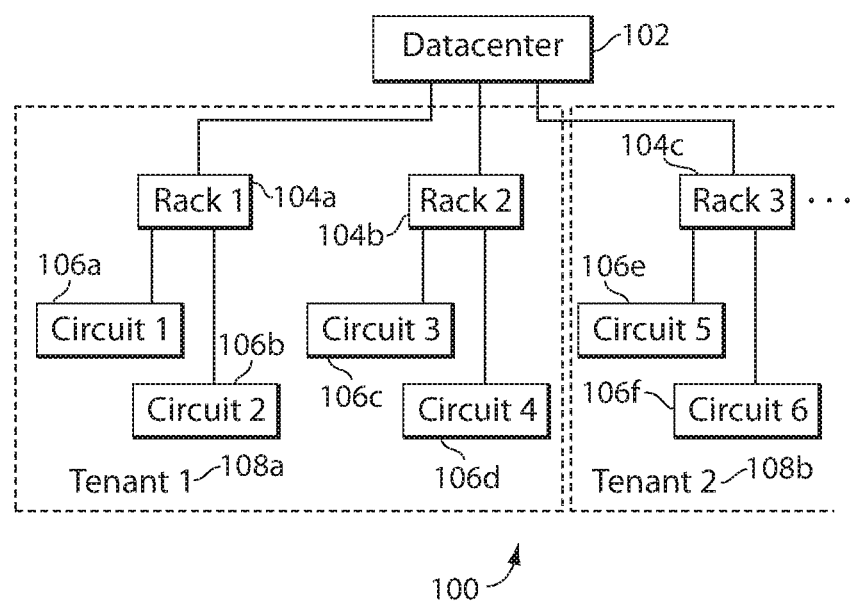
FIG. 1 is a block diagram of an example power system.

FIG. 1 shows a block diagram of an example power system 100. The power system 100 includes a datacenter 102. The datacenter 102 includes racks 104, which each include circuits 106. The datacenter 102 also includes tenants 108 who rent the racks 104 in the datacenter 102. For example, a first tenant, Tenant1 108a can rent a Rack1 104a and a Rack2 104b. The Rack1 104a can include a Circuit1 106a and a Circuit2 106b, while the Rack2 104b can include a Circuit3 106c and a Circuit4 106d. A Rack3 104c can include a Circuit5 106e and a Circuit6 106f and a Tenant2 108b can be the renter of the Rack3 104c. While the example power system 100 shows a datacenter, racks, circuits, and tenants, power systems can include any appropriate device elements and logical elements. For example, power systems can include device elements such as power distribution units (PDUs), remote power panels (RPPs), panels, meters, and other devices that provide, use, and/or generate power or measure characteristics of power system elements. Power systems can also include logical elements such as floors, rooms, buildings, zones, tenants, companies, and other people, entities, places, and objects that have a relation to power system elements.

Figure 2:
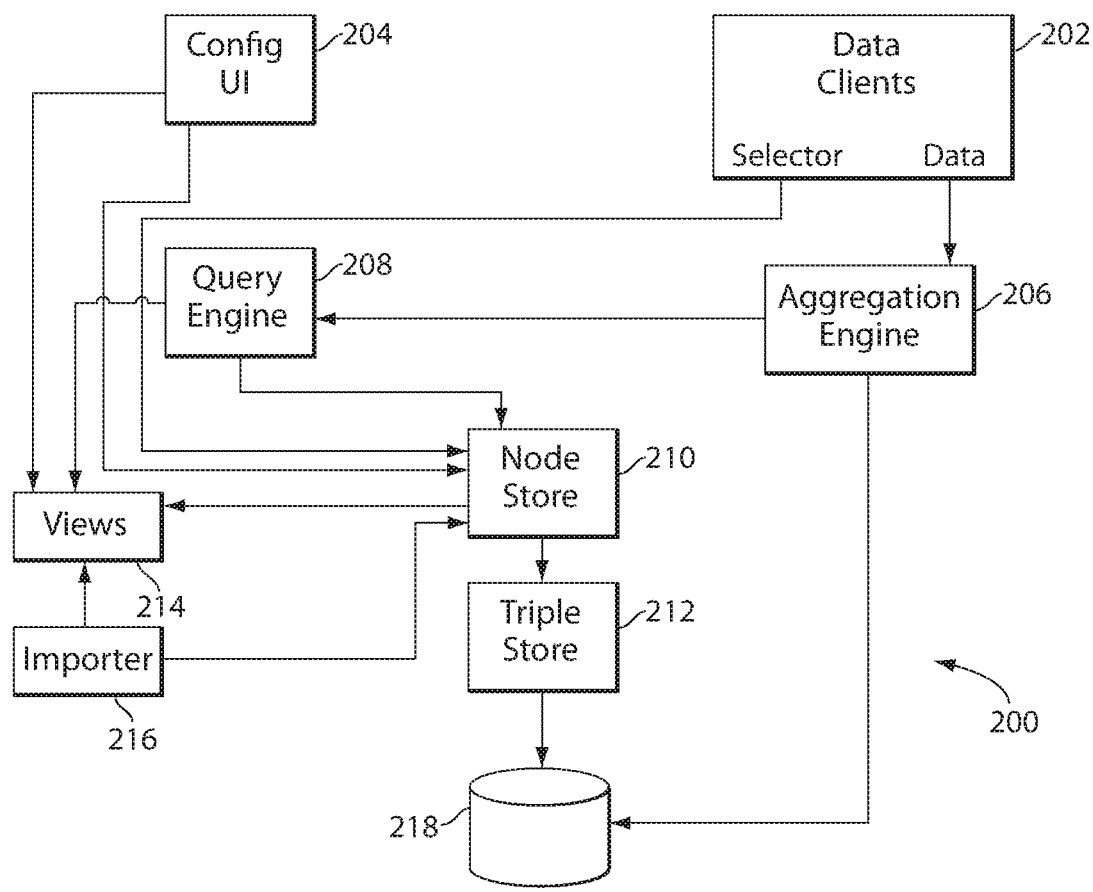
FIG. 2 is a block diagram of an example power system representation system.

FIG. 2 shows a power system representation system 200, which can receive data descriptive of the power system elements and relationships between the power system elements. For example, referring also to FIG. 1, the representation system 200 can receive information about each of the device elements, such as the racks 104 and the circuits 106, as well as the logical elements, such as the datacenter 102 and the tenants 108. The representation system 200 can receive the data from data clients 202. Data clients 202 can receive and provide information about the power system elements, as well as measured characteristics of the power system elements, such as power usage. In some embodiments, power system element data can be processed by a node store 210, and measured characteristic data can be processed by an aggregation engine 206. Each of the elements can be represented as a node. The representations can be defined and stored in the node store 210. Each element can also include attributes corresponding to properties of the element. Some attributes can be included in all elements, such as a name of the element and a type of the element. Some attributes can vary depending on the type of element. For example some device elements can include attributes such as a breaker rating. Tenants can include attributes such as contact information.

The representation system 200 can also receive information about relationships between elements. For example, the datacenter 102 includes Rack1 104a, which in turn includes Circuit1 106a and Circuit2 106b. Relationship information can be associated with the appropriate nodes. For example, a node representing the datacenter 102 can include attribute information, such as an address of the datacenter, as well as relationship information, such as the racks included in the datacenter 102. Attribute information and relationship information can be stored as data triples in a triple store 212. Relationship information can also include a cardinality. For example, relationships can be constrained to be one-to-one, one-to-many, or one-to-N. Similarly, attributes can also be assigned cardinalities. For example, a node can be constrained to have only one type, which would entail assigning a one-to-one cardinality to the "type" attribute. As another example, a datacenter can include many racks, so the relationship between a datacenter and a rack can be one-to-many Conversely, a rack can be constrained to be located in one datacenter at a time, so the converse relationship can be one-to-one. An example one-to-N cardinality can be a rack that is powered by a fixed number of circuits, such as 2, could be assigned a one-to-two cardinality.

In some embodiments, elements can also include subtypes. A subtypes can inherent the attributes of its parent type and also include additional attributes not found within its parent type. For example, racks can include subtypes such as 2-circuit racks and 3-circuit racks, depending on how many circuits to which the rack is configured to connect.

In some embodiments, the representation system 200 can also receive time information. For example, a node and/or a relationship can include a start date and an end date. For example, a tenant can start renting two racks of a datacenter on February 1 and decide to rent additional racks starting on June 1. Such time information can be captured in the representation system by including start dates and end dates (or start dates/end dates and duration) for each relationship. Similarly, end dates can be included for terminations of relationships and/or nodes. For example, if a datacenter is destroyed, the datacenter node can include an end date to indicate the termination of the datacenter. In some embodiments, an end date for a node can be effected by including an end date for all the relationships that include the node. In some embodiments, the triple store 212 can be a modified triple store to include a time component for the data.

The representation system 200 can include an importer 216 configured to receive data related to power system elements and import the data into the node store 210. The importer 216 can receive data in a pre-defined format, such as a comma separated value (CSV) file to import data related to many power system elements at once.

In some embodiments, the representation system can receive the information relating to the power system elements and the relationships between the power system elements and generate a hierarchy of nodes depicting the relationships between the nodes. The hierarchy of nodes can be based on a view 214 of the power system. Views can structure the data from the node store 210 into a hierarchy based on one or more elements of the power system, showing a subset or all the elements of the power system. In some embodiments, views can be based on real-world applications and/or domains. The views 214 can be selected based on queries received by a query engine 208 of the representation system 200.

For example, referring to FIG. 3, a first view, View1 300a can be grouped by power distribution units (PDUs). The views can have a selection box 302, which determines an element on which the view is based. The selection box 302 for the View1 300a is set to PDU, and thus the hierarchy of the View1 300a is based on a PDU1 304a. The PDU1 304a includes remote power panels (RPPs) 306, which in turn include panels 308. The panels 308 include circuits 106. By defining each of the immediate relationships, the representation system 200 can determine hierarchies including distant relationships. For example, the representation system 200 receives information that circuits are children of panels and can determine that the circuits are grandchildren of RPPs and great-grandchildren of PDUs. In some embodiments, the View1 300a can be based on a real-world application such as an electrician view, focusing on device elements and providing information about the circuits 106 grouped into the panels 308, grouped by the RPPs 306, grouped by the PDU 304.

For each node that includes children, an icon can be displayed next to the node that allows a user to expand and collapse the hierarchy under the node. For example, the PDU1 304a has a minus sign next to the node, indicating that the children of the PDU1 304a: a RPP1 306a, a RPP2 306b, a RPP3 306c, and a RPP4 306d are currently visible. Similarly, a Panel1 308a has a minus sign next to the node and thus the circuits 106 that are related to the Panel1 308a are shown. In contrast, a Panel2 308b has a plus sign next to the node and thus any circuits related to the Panel2 308b are not currently visible.

The selection box 302 of a second view, View2 300b, is set to rack, and as a result, the View2 300b can be based on racks 104, which can be a different subset of the elements of the same power system 100 shown in the View1 300a. The datacenter 102 includes the racks 104, which in turn include the circuits 106. As the View2 300b is based on the racks 104, the PDU 304, RPPs 306, and panels 308 of the View1 300a are not shown in the View2 300b while the circuits 106 are visible, grouped by the racks 104. In some embodiments, the View2 300b can be based on a real-world application such as an electrician view or a datacenter manager view.

A third view, View3 300c, is based on the tenants 108, as the selection box 302 is set to tenant. The information displayed by the representation system 200 can show which of the tenants 108 are occupying which of the racks 104. The relationships between the racks 104 and the circuits 106 can be presented as shown in the View2 300b, with the racks 104 further grouped by the tenants 108. The View3 300c can be useful to a facility manager, for example, to determine racks that are available for new tenants.

In some embodiments, each of the nodes can also be associated with one or more measuring devices, measuring one or more characteristics of the element of the node. For instance, each circuit can be associated with a meter that measures how much power is used at the circuit. One example of a programmable measuring device is described further below with reference to FIG. 8. The representation system can calculate and provide information relating to the measured characteristics for specific time period. For example, a user can query the representation system 200 to determine how much power was used by the Circuit1 106a over the past year. The representation system 200 can calculate the power used by the requested element over the requested period of time and provide a summary value to the user. In some embodiments, a measuring device measures characteristics for more than one node and/or for a node including children nodes. For example, a measuring device can measure power usage for a rack and the measured power usage can be divided between the circuits of the rack.

In some embodiments, each parent node can provide aggregation points for the child nodes under the parent node. For example, the representation system can provide summary values for power used by the Rack1 104a over a requested period of time, which would provide the power used by both the Circuit1 106a and the Circuit2 106b over the period of time. As another example, the user of the representation system can request the power used by the Tenant1 108a over the past nine months. The representation system can use the relationship information for the Tenant1 108a to determine which racks 104 were occupied by the Tenant1 108a during the requested time period. For example, the representation system 200 can use the start dates and end dates of the relationships to determine the appropriate racks for which power usage measurements will be aggregated.

In some embodiments, aggregation and grouping of nodes can also be based on attributes. For example, the representation system can provide summary values for power used by all racks or all racks with three circuits.

Figure 4:
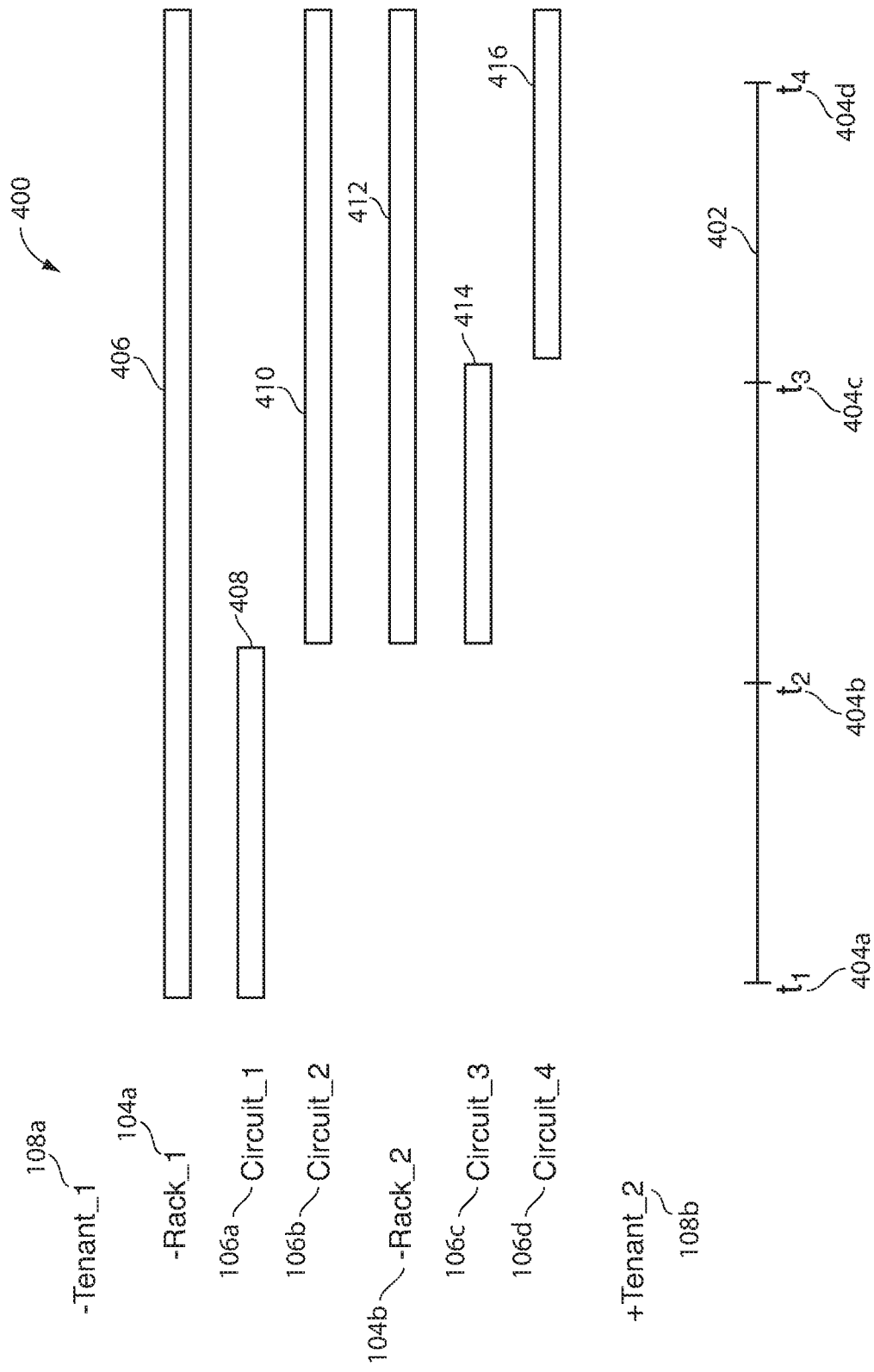
FIG. 4 is an example timeline chart of an example power system.

FIG. 4 shows an example timeline chart 400 of the example power system 100. The timeline chart 400 shows an example usage by the Tenant1 108a of the Rack1 104a and the Rack2 104b over a time range 402 from a first time, t1 404a, to a fourth time, t4 404d. For example, the Tenant1 108a can be occupying the Rack1 104a, which can be powered by the Circuit1 106a from the time t1 404a to a second time t2 404b, as shown by a bar 408 corresponding to the Circuit1 106a and starting at the time t1 404a and the ending at the time t2 404b. At the time t2 404b, the Circuit1 106a stops powering the Rack1 104a and the Circuit2 106b starts powering the Rack1 104a. Such a change in usage can be due to, for example, a changing of equipment provided by the datacenter or various other reasons. The Rack1 104a can be powered by the Circuit2 106b from the time t2 404b through a third time t3 404c and until the time t4 404d, represented by a bar 410 corresponding to the Circuit2 106b. The time range 402 can be shown as a result of a query from the user for the specific time range 402. Alternatively or additionally, the time range 402 can be a default time range, such as the entire length of time for which the Tenant1 108a has data relating to the power system 100.

At the time t2 404b, the Tenant1 108a can also start occupying an additional rack, the Rack2 104b, which can be powered by, the Circuit3 106c on the Rack2 104b, shown by a bar 414 corresponding to the Circuit3 106c. For example, the Tenant1 108a can be a business which grows to require more computers in the datacenter or various other scenarios. The Rack2 104b is powered by the Circuit3 106c from the time t2 404b to the time t3 404c, at which the Rack2 104b switches from the Circuit3 106c to the Circuit4 106d until the time t4 404d, as shown by the ending of a bar 414 corresponding to the Circuit3 106c and a bar 416 corresponding to the Circuit4 106d. For each of these time periods of the Tenant1 108a using racks 104 being powered by each of the circuits 106, one or more measuring devices can measure one or more characteristics of each of the circuits 106. For example, a meter can be connected to each of the circuits 106 to measure power usage by the Tenant1 108a for each respective period of time.

The representation system 200 can be queried to determine a summary value, such as a total power usage by the Tenant1 108a from the time t1 404a to the time t4 404d. The representation system 200 can aggregate the power usage measured at each circuit to determine the total power usage by the Tenant1 108a. For example, the representation system 200 can aggregate the power usage at a rack level. As the circuits 106 are grouped by the racks 104, the representation system 200 can aggregate the power usage for each rack 104. The Rack1 104a includes the Circuit1 106a, which powered Rack1 104a from the time t1 404a to the time t2 404b, and the Circuit2 106, which was occupied from the time t2 404b to the time t4 404d. A bar 406 corresponding to the Rack1 104*a* starts at the time t1 404*a* and ends at the time t4 404*d*, showing the Rack1 104*a* belonged to the Tenant1 108*a* throughout the time period t1 404*a* to t4 404*d*. Thus, the representation system 200 would aggregate the usage of the Circuit1 106*a* and the Circuit2 106*b* for the applicable times in the time period t1 404*a* to t4 404*d*. Similarly, a bar 412 corresponding to the Rack2 104*b* shows the Rack2 104*b* was occupied by the Tenant1 108*a*, starting at the time t2 404*b* and also ending at the time t4 404*d* and power usage by the Circuit3 106*c* and the Circuit4 106*d* should be aggregated during that time.

To determine the summary value of total power usage by the Tenant1 108*a*, the power usage aggregated at the Rack1 104*a* and the Rack2 104*b* can be aggregated from the time t1 404*a* to the time t4 404*d* to calculate the total power usage. In some embodiments, the measured characteristic can be measured at a point in time or within a time increment, such as every fifteen minutes, every thirty minutes, every three hours, or some other time increment. The measurements can be recorded and stored for each device element.

Upon receiving a query for a summary value for a specific time period for a specific device element or a logical element, the representation system 200 can determine which other device elements and logical elements should be aggregated to determine the summary value. The other power system elements to be included can depend on a selected view of the power system elements as well as the time periods of the relationships between the other power system elements and the specific device element or logical element. The representation system 200 can aggregate all the recorded measurements for the associated power system elements for the specific time period to determine the summary value.

Figure 5:
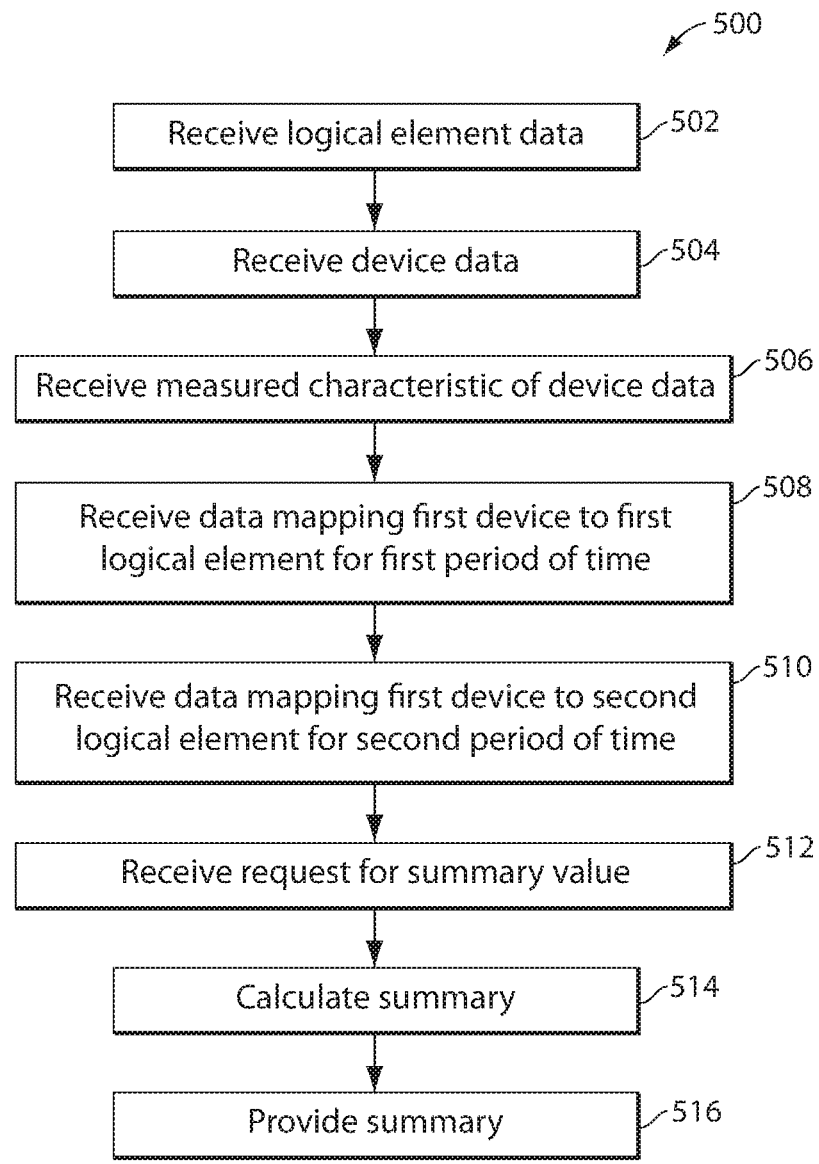
FIG. 5 is a flow chart of an example process of an example representation system.

FIG. 5 is a flow chart of an example process 500 of the representation system 200. At act 502, the representation system 200 receives logical element data. The logical element data can include information associated with logical elements of a power system. The logical element data can include relationship and attribute data of the logical elements, which the representation system 200 can store. For example, the representation system 200 can store the data as nodes using a triple store and a node store, as described above. At act 504, the representation system 200 receives device data. Device data can include information associated with device elements of the power system, including attribute and relationship data of the device elements, as described above. The representation system 200 can store the device data, similar to the storing of the logical element data.

At act 506, the representation system 200 receives measured characteristic data, which can include measured characteristics of one or more of the device elements. In some embodiments, device elements that have no child elements (e.g., leaf nodes in a hierarchy of the power system) can each generate measured characteristic data. In some embodiments, measurement data is received from device elements higher in the hierarchy of the power system, and the measurement data can be divided between the children of the device. The measured characteristic can be, for example, power usage by each of the device elements.

At act 508, data mapping a first device to a first logical element for a first period of time is received. For example, a power distribution unit can be mapped to a first floor of a datacenter for a time such as the first six months of a year. At act 510, data mapping the first device to a second logical element for a second period of time is received. For example, the power distribution unit can be moved downstairs for the second half of the year, and thus mapped to a basement of the datacenter.

At act 512, a request for a summary value is received. The summary value request can be for the first logical element for a time period including the first and second time periods. For example, a datacenter manager can request a summary value of the power used on the first floor of the datacenter for the year.

At act 514, the summary value is calculated. The representation system 200 can calculate the summary value by aggregating measured values for the first device during the first time period and not the second time period, as the first device was associated with the first logical period only for the first time period. For example, calculating the summary value can include adding up the power usage measurements of the power distribution unit for the first six months, since the power distribution unit was on the first floor for the first six months. But as the power distribution unit was moved to the basement for the last six months of the year, the power usage measurements for the last six months would not be aggregated in the summary value.

At act 516, the summary value can be provided. While this example involves one device element associated with a first and second logical element for a first and second time period, respectively, different combinations of device elements, logical elements, and time periods can be involved in calculating summary values. For example, one logical element can be associated with a first and second device element for a first and second time period, respectively. Alternatively or additionally, device elements can be associated with other device elements (e.g., racks including circuits, as described above), and logical elements can be associated with other logical elements (e.g., rooms on a floor of a datacenter), any of which can be aggregated for calculating summary values. Alternatively or additionally, multiple device elements can be associated with multiple logical elements and vice versa.

While the example measured characteristic discussed above is power usage, any appropriate characteristic can be measured, such as current drawn, cost of power, and various other characteristics.

FIG. 6 shows an example interface 600 of the representation system 200. The example interface 600 includes tabs 602, which can correspond to each of the device elements and logical elements of one or more views. For example, the interface 600 can correspond to the views 300 shown in FIG. 3, and have a summary tab 602*a*, a PDU tab 602*b*, an RPP tab 602*c*, a panel tab 602*d*, a circuit tab 602*e*, a rack tab 602*f*, and a tenant tab 602*g*, corresponding to each of the power system elements of the views 300 shown in FIG. 3. In the example interface 600, the panel tab 602*d* is selected, and a heading 604 shows the selected power system element.

The interface 600 can show a chart with the selected power system element as the first column 606. The first column 606 shows a name of each of the panels 308 of the power system 100. The panels 308 are grouped by the RPPs 306, which is shown in a second column 308. For example, the Panel1 308*a* is associated with the RPP1 306*a*, as shown in the first row of the chart. The panels 308 can have additional attributes, which can be displayed in additional columns, such as a third and fourth column 610, 612. Columns can also display time information, such as a start date and an end date of a relationship, such as the relationship between a panel and an associated RPP.

The interface 600 can allow a user to add additional instances of the selected power system device. For example, the user can select a "new" button 614 to add a new row to the column representing a new instance of the power system device, in this example a new panel. The new row can allow the user to enter information related to the new panel added to the power system. Information related to the new panel can include attribute information and relationship information. For example, by selecting an RPP to be associated with the new panel, the user can input relationship information between the new panel and the selected RPP.

The interface 600 can also allow the user to delete instances of the selected power system device. For example, a "delete" button 616 is next to the "new" button 614, which can allow the user to select an instance to delete. In this example interface 600, the row for the Panel4 308*d* is darkened, which can indicate that the Panel4 308*d* is currently selected, and if the "delete" button 616 were selected, the Panel4 308*d* would be removed from the power system.

The interface 600 can also allow the user to edit information related to the selected power system device.

Figure 7:
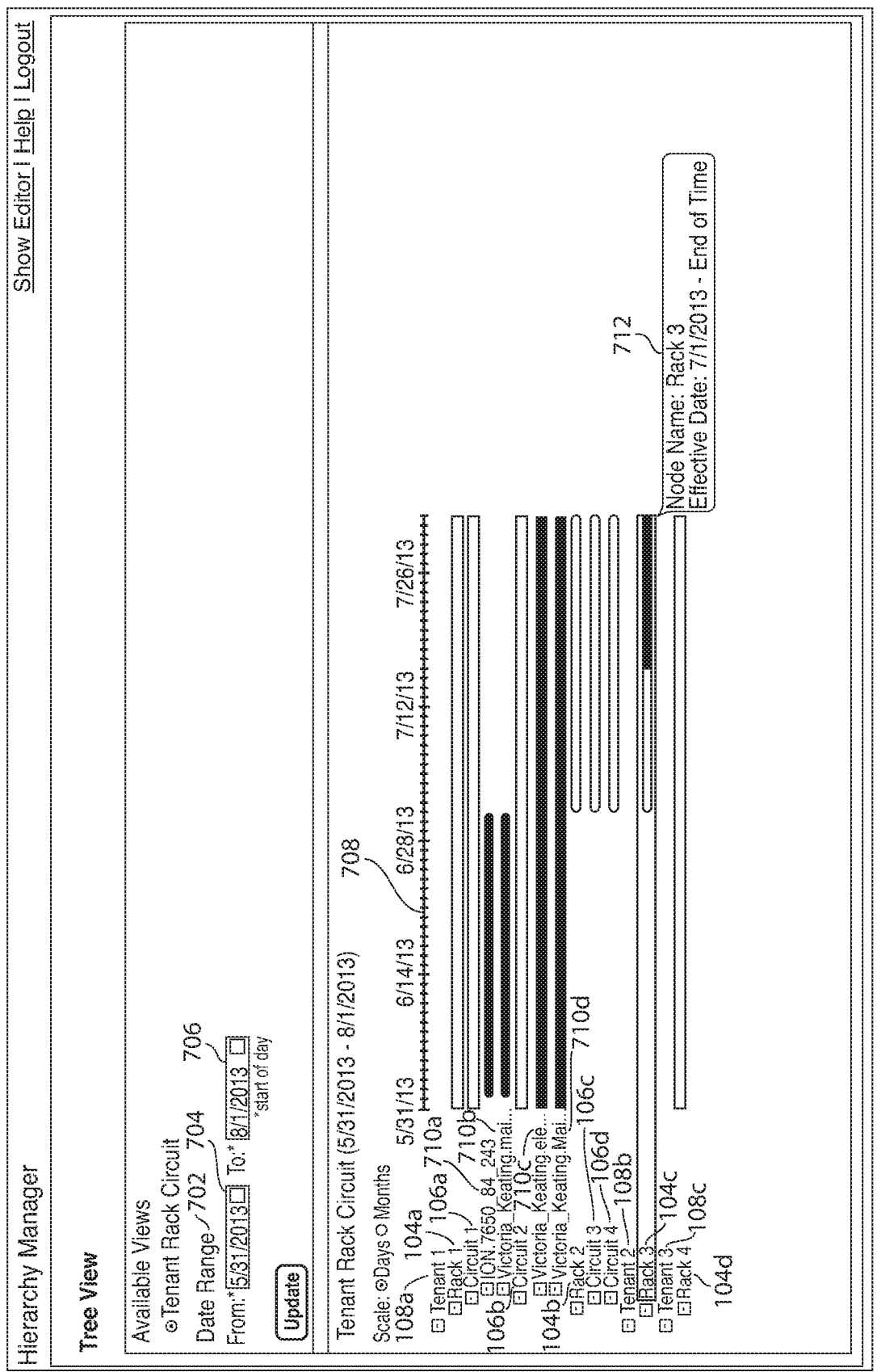
FIG. 7 is a screenshot of an example user interface.

FIG. 7 shows another example interface 700 of the representation system 200. The example interface 700 shows a view similar to the view 300*c* of the power system 100 shown in FIG. 3, but including time information, similar to the time information shown in the timeline chart 400 of FIG. 4. The interface 700 can include a date range 702, which can be selected by the user. For example, the user can set a start date 704 and an end date 706 of the date range 702. The interface 700 can show relationship information, similar to that described above with reference to FIG. 4, for the selected date range 702. For example, for the selected date range 702 shown, from May 31, 2013 to Aug. 1, 2013, the Tenant1 108*a* is associated with the Rack1 104*a* and the Rack2 104*b*. A bar associated with the Rack1 104*a* shows that the Tenant1 108*a* occupied the Rack1 104*a* for the span of the entire selected date range 702. In contrast, a bar associated with the Rack2 104*b* only starts halfway through, around what would correspond to Jul. 1, 2013 to the of the time period, indicating the Tenant1 108*a* started occupying the Rack2 104*b* on Jul. 1, 2013. Correspondingly, bars displayed with the Circuit3 106*c* and the Circuit4 106*d*, associated with the Rack2 104*b* also start halfway through, indicating Circuit3 106*a* and Circuit4 106*d* started powering Rack2 104*b* at that time.

The interface 700 can also allow the user to select elements, and show a popup box 712 to give additional information of the selected element. The popup box 712 shows a name of the selected node (e.g., Rack3), as well as an effective date (e.g., Jul. 1, 2013—End of time). In some embodiments, "end of time" or some other designation can be used for the end date when no end date is specified, indicating that the relationship is valid currently and until changed. The interface 700 can also display the timeline in varying scales, such as days, weeks, months, years, or other time increments.

Computer System

As discussed above with regard to FIG. 2, various aspects and functions described herein may be implemented as specialized hardware or software components executing in one or more programmable devices. These programmable devices are configured to independently (i.e., without instructions from a centralized control system) perform one or more specialized automated functions on a periodic basis. Programmable devices have a wide range of potential applications. The characteristics of particular types of programmable devices vary depending on the function that the programmable device is configured to perform. For instance, programmable devices configured for external use may include a rigid and insulated housing, while programmable devices configured to monitor environmental conditions may include one or more sensors configured to measure these environmental conditions. Some specific examples of programmable devices include uninterruptible power supplies, power and resource monitoring devices, protection relays, programmable logic controllers, and utility meters, such as a utility meter 800 as illustrated in FIG. 8.

Figure 8:
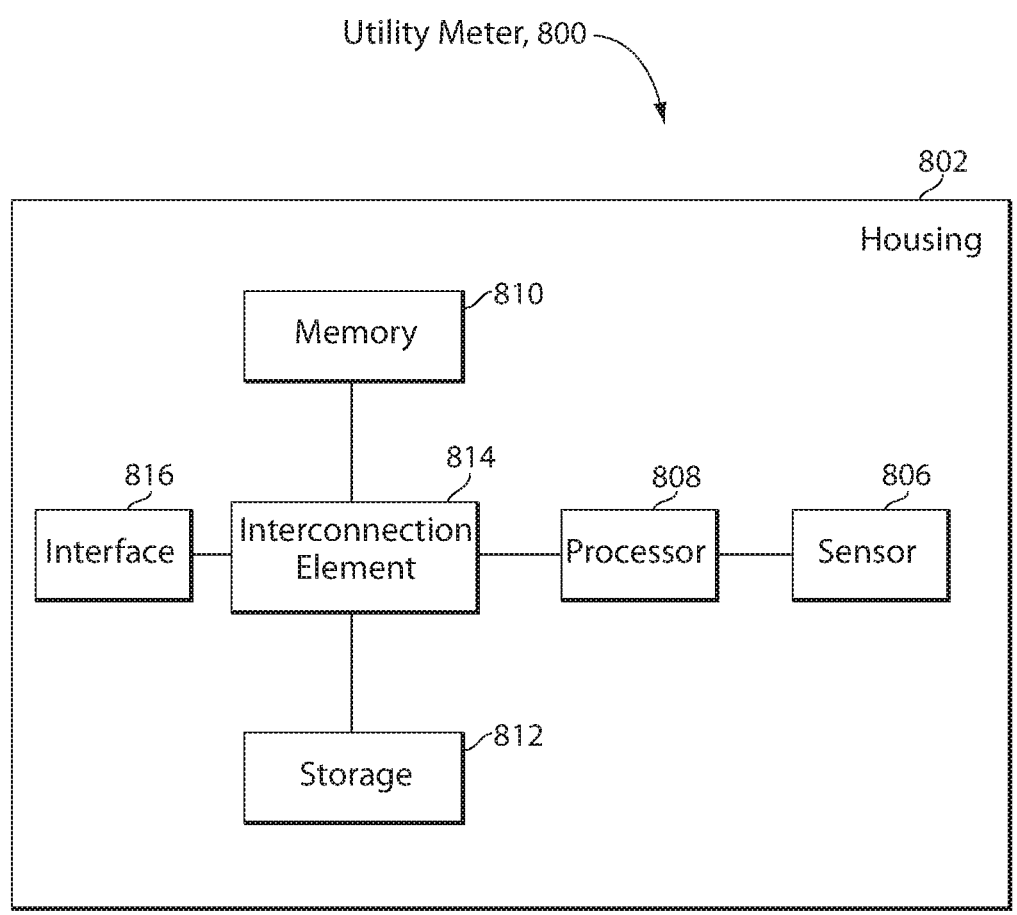
FIG. 8 is a block diagram of an example utility meter.

As shown in FIG. 8, the utility meter 800 comprises a housing 802 that includes, a sensor 806, a processor 808, a memory 810, a data storage device 812, an interconnection element 814, and an interface 816. To implement at least some of the aspects, functions, and processes disclosed herein, the processor 808 performs a series of instructions that result in manipulated data. The processor 808 may be any type of processor, multiprocessor, or controller.

The memory 810 stores programs and data during operation of the utility meter 800. Thus, the memory 810 include any device for storing data, such as a disk drive or other non-volatile storage device, but typically includes a relatively high performance, volatile, random access memory such as a dynamic random access memory (DRAM) or static memory (SRAM). Various embodiments may organize the memory 810 into particularized and, in some cases, unique structures to perform the functions disclosed herein. These data structures may be sized and organized to store values for particular data and types of data.

As shown in FIG. 8, several of the components of the utility meter 800 are coupled to the interconnection element 814. The interconnection element 814 may include any communication coupling between components of the utility meter, such as one or more physical busses subscribing to one or more specialized or standard computing bus technologies such as IDE, SCSI, and PCI. The interconnection element 814 enables communications, such as data and instructions, to be exchanged between components of the utility meter 800.

The utility meter 800 also includes one or more interface devices 816 such as input devices, output devices and combination input/output devices. Interface devices may receive input or provide output. More particularly, output devices may render information for external presentation. Input devices may accept information from external sources. Examples of interface devices include buttons, keyboards, touch screens, network interface cards, and the like. Interface devices allow the utility meter 800 to exchange information with and to communicate with external entities, such as users and other systems.

The data storage device 812 includes a computer readable and writeable nonvolatile, or non-transitory, data storage medium in which instructions are stored that define a program or other object that is executed by the processor 808. The data storage 812 also may include information that is recorded, on or in, the medium, and that is processed by the processor 808 during execution of the program. More specifically, the information may be stored in one or more data structures specifically configured to conserve storage space or increase data exchange performance. The instructions may be persistently stored as encoded signals, and the instructions may cause the processor 808 to perform any of the functions described herein. The medium may, for example, be optical disk, magnetic disk or flash memory, among others.

As shown in FIG. 8, the sensor 806 is coupled to the processor 808. The sensor 806 includes an analog sensor and analog to digital converter to provide the processor 808 with a digital signal that represents a quantity of flow (e.g. usage)

of a utility as detected by the analog sensor. The particular configuration of the sensor 806 varies depending on the utility being measured by the utility meter 800. For example, in an embodiment including a meter that measures electricity, the sensor 806 includes inputs for single phase or three phase power and records periodic measurements of one or more identified characteristics (e.g., power, voltage, current, etc.) of the electric circuit via the inputs. Upon receipt of these periodic measurements, the processor 808 stores information descriptive of the measurements and the times that the measurements were taken in the data storage element 812. Further, in some embodiments, the processor 808 subsequently transmits the stored information descriptive of the measurements to an external entity via a network interface included in the interface devices 816.

Some embodiments of the utility meter 800 include operational parameters that may be configured via protected functionality provided by the utility meter 800. These operational parameters may be used to configure CT/PT ratio, system type, demand calculations, I/O setup, onboard data logging, onboard waveform capture, and onboard alarming.

Although the utility meter 800 is shown by way of example as one type of utility meter upon which various aspects and functions may be practiced, aspects and functions are not limited to being implemented on the utility meter 800 as shown in FIG. 8. Various aspects and functions may be practiced on one or more utility meters having a different architectures or components than that shown in FIG. 8. For instance, the utility meter 800 may include specially programmed, special-purpose hardware, such as an application-specific integrated circuit (ASIC) tailored to perform one or more particular operations disclosed herein.

In some examples, the components of the utility meter 800 disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

As discussed above with regard to FIG. 2, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 9:
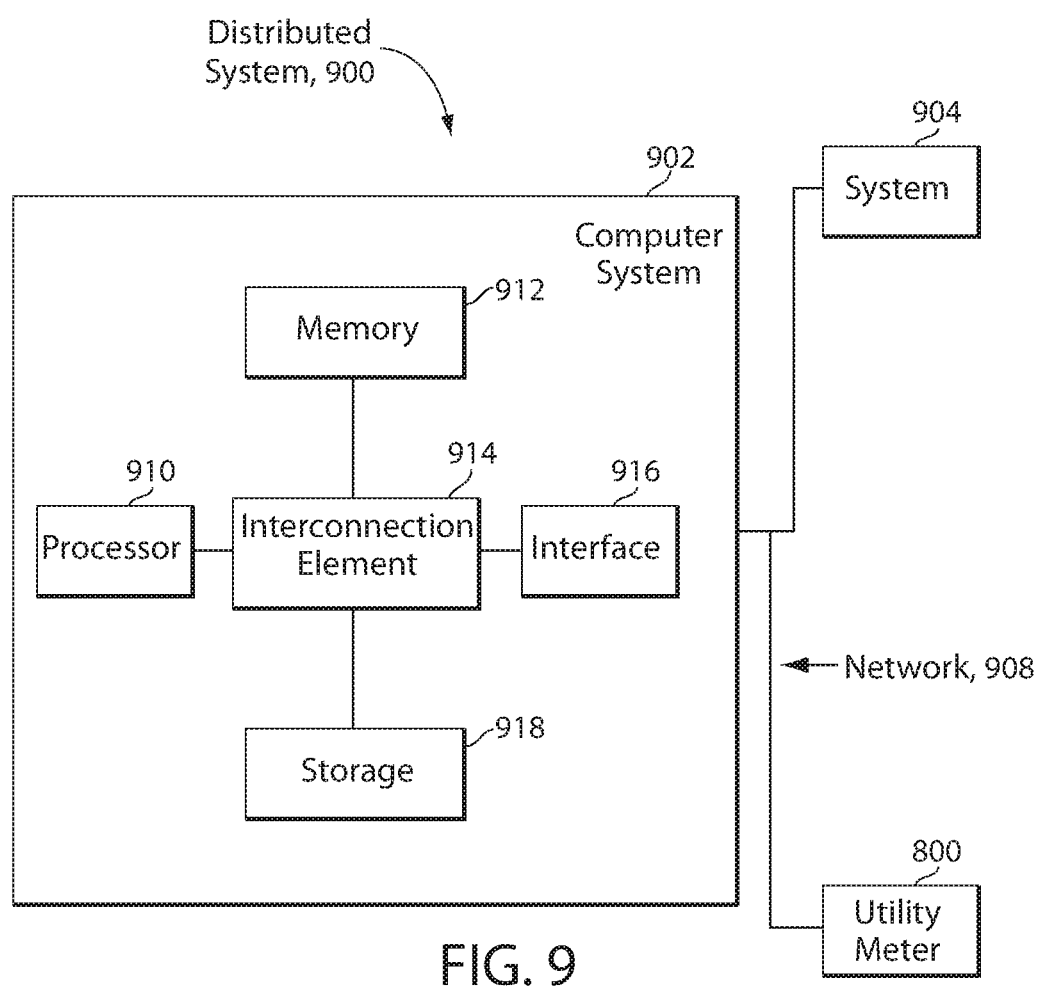
FIG. 9 is a block diagram of an example computer system.

Referring to FIG. 9, there is illustrated a block diagram of a distributed computer system 900, in which various aspects and functions are practiced. As shown, the distributed computer system 900 includes one more computer systems that exchange information. More specifically, the distributed computer system 900 includes computer systems 902 and 904 and utility meter 800. As shown, the computer systems 902 and 904 and utility meter 800 are interconnected by, and may exchange data through, a communication network 908. The network 908 may include any communication network through which computer systems may exchange data. To exchange data using the network 908, the computer systems 902 and 904 and utility meter 800 and the network 908 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 902 and 904 and utility meter 800 may transmit data via the network 908 using a variety of security measures including, for example, TLS, SSL, or VPN. While the distributed computer system 900 illustrates three networked computer systems, the distributed computer system 900 is not so limited and may include any number of computer systems and computing devices, networked using any medium and communication protocol.

As illustrated in FIG. 9, the computer system 902 includes a processor 910, a memory 912, an interconnection element 914, an interface 916 and data storage element 918. To implement at least some of the aspects, functions, and processes disclosed herein, the processor 910 performs a series of instructions that result in manipulated data. The processor 910 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 910 is connected to other system components, including one or more memory devices 912, by the interconnection element 914.

The memory 912 stores programs and data during operation of the computer system 902. Thus, the memory 912 may be a relatively high performance, volatile, random access memory such as a dynamic random access memory ("DRAM") or static memory ("SRAM"). However, the memory 912 may include any device for storing data, such as a disk drive or other nonvolatile storage device. Various examples may organize the memory 912 into particularized and, in some cases, unique structures to perform the functions disclosed herein. These data structures may be sized and organized to store values for particular data and types of data.

Components of the computer system 902 are coupled by an interconnection element such as the interconnection element 914. The interconnection element 914 may include any communication coupling between system components such as one or more physical busses in conformance with specialized or standard computing bus technologies such as IDE, SCSI, PCI and InfiniBand. The interconnection element 914 enables communications, such as data and instructions, to be exchanged between system components of the computer system 902.

The computer system 902 also includes one or more interface devices 916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 902 to exchange information and to communicate with external entities, such as users and other systems.

The data storage element 918 includes a computer readable and writeable nonvolatile, or non-transitory, data storage medium in which instructions are stored that define a program or other object that is executed by the processor 910. The data storage element 918 also may include information that is recorded, on or in, the medium, and that is processed by the processor 910 during execution of the program. More specifically, the information may be stored in one or more data structures specifically configured to conserve storage space or increase data exchange performance. The instructions may be persistently stored as encoded signals, and the instructions may cause the processor 910 to perform any of the functions described herein. The medium may, for example, be optical disk, magnetic disk or flash memory, among others. In operation, the processor 910 or some other controller causes data to be read from the nonvolatile recording medium into another memory, such as the memory 912, that allows for faster access to the information by the processor 910 than does the storage medium included in the data storage element 918. The memory may be located in the data storage element 918 or in the memory 912, however, the processor 910 manipulates the data within the memory, and then copies the data to the storage medium associated with the data storage element 918 after processing is completed. A variety of components may manage data movement between the storage medium and other memory elements and examples are not limited to particular data management components. Further, examples are not limited to a particular memory system or data storage system.

Although the computer system 902 is shown by way of example as one type of computer system upon which various aspects and functions may be practiced, aspects and functions are not limited to being implemented on the computer system 902 as shown in FIG. 9. Various aspects and functions may be practiced on one or more computers having a different architectures or components than that shown in FIG. 9. For instance, the computer system 902 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 902 may be a computer system including an operating system that manages at least a portion of the hardware elements included in the computer system 902. In some examples, a processor or controller, such as the processor 910, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 910 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one example, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. A system for tracking power usage of a power system, the system comprising:
one or more measuring devices in communication with elements of the power system and configured to measure one or more characteristics of the power system elements, the power system elements including a plurality of logical elements and a plurality of device elements, the plurality of device elements including devices that provide, use, and/or generate power, and the plurality of logical elements including entities and objects having a relationship to the plurality of device elements;
a computer-based system in communication with the measuring devices, the computer-based system including:
a memory device; and
at least one hardware processor coupled to the memory device and configured to:
receive data descriptive of the plurality of logical elements including data descriptive of a first logical element and a second logical element, the first logical element being different from the second logical element;
receive data descriptive of the plurality of device elements including data descriptive of a first device;
receive data descriptive of a plurality of measured characteristics of the plurality of device elements from the measuring devices including data descriptive of a first measured characteristic of the first device, the first measured characteristic corresponding to power usage of the first device;
receive data mapping the first device to the first logical element for a first period of time, the data mapping including data descriptive of relationships between the first device and the first logical element for the first period of time;
receive data mapping the first device to the second logical element for a second period of time different from the first period of time, the data mapping including data descriptive of relationships between the first device and the second logical element for the second period of time;
receive, from a user interface of the computer-based system, a request for information related to power usage for at least one of the first logical element and the second logical element over a period of time spanning the first period of time and the second period of time;
determine, in response to receiving the request for information related to power usage for the first logical element, power usage for the first logical element using one or more values of the first measured characteristic recorded during the first period of time and not using one or more values of the first measured characteristic recorded during the second period of time; and
use information related to the power usage of the first logical element to track power usage of the power system and provide information on resource use and availability.

2. The system of claim 1, wherein the data descriptive of the plurality of device elements includes data descriptive of a second device different from the first device, the data descriptive of the plurality of measured characteristics includes data descriptive of a second measured characteristic of the second device, and the at least one processor is further configured to: receive data mapping the second device to the first logical element for the second period of time; receive data mapping the second device to the second logical element for the first period of time; determine, in response to receiving the request for information related to power usage for the second logical element, power usage for the second logical element using one or more values of the second measured characteristic recorded during the first period of time and using the one or more values of the first measured characteristic recorded during the second period of time; and use information related to the power usage of the second logical element to track power usage of the power system and provide information on resource use and availability.

3. The system of claim 2, wherein the data descriptive of the plurality of logical elements includes data descriptive of a third logical element different from the first logical element and the second logical element, and the at least one processor is further configured to: receive data linking the first logical element and the second logical element to the third logical element; receive, from the user interface, a request for information related to power usage for the third logical element over a period of time spanning the first period of time and the second period of time; determine, in response to receiving the request for information related to power usage for the third logical element, power usage for the third logical element using the one or more values of the first measured characteristic recorded during the first period of time, using the one or more values of the first measured characteristic recorded during the second period of time, using the one or more values of the second measured characteristic recorded during the first period of time, and using one or more values of the second measured characteristic recorded during the second period of time; and use information related to the power usage of the third logical element to track power usage of the power system and provide information on resource use and availability.

4. The system of claim 3, wherein the at least one processor is configured to provide the information related to the power usage of the first logical element, the second logical element, and the third logical element in the user interface.

5. The system of claim 1, wherein the first device includes a power distribution unit.

6. The system of claim 3, wherein the device elements include meters, the first logical element and the second logical element represent circuits, and the third logical element represents a rack.

7. The system of claim 1, wherein the power system includes a datacenter and the device elements include racks in the datacenter and circuits located in the racks.

8. The system of claim 7, wherein each of the circuits is associated with a respective metering device of the measuring devices configured to measure power usage at the circuits.

9. The system of claim 7, wherein the measuring devices are configured to measure power usage for the racks, and the measured power usage is capable of being divided between the circuits of the racks based on relationship information.

10. The system of claim 1, wherein the first period of time is the first half of a particular year, the second period of time is the second half of the particular year, and the first device is mapped to the first logical element for the first period of time and not mapped to the second logical element for the second period of time.

11. The system of claim 1, wherein the information on resource use and availability is used to determine operational costs for the first logical element over the period of time spanning the first period of time and the second period of time.

12. The system of claim 1, wherein the information on resource use and availability is used to determine resource availability of device elements associated with the first logical element.

13. A method for tracking power usage of a power system comprising power system elements with the power system elements in communication with one or more measuring devices configured to measure one or more characteristics of the power system elements, the method comprising:
receiving, at an input of a hardware processor of a computer-based system in communication with the measuring devices, data descriptive of a plurality of logical elements of the power system elements including data descriptive of a first logical element and a second logical element, the first logical element being different from the second logical element;
receiving data descriptive of a plurality of device elements of the power system elements including data descriptive of a first device;
receiving data descriptive of a plurality of measured characteristics of the plurality of device elements including data descriptive of a first measured characteristic of the first device, the first measured characteristic corresponding to power usage of the first device;
receiving data mapping the first device to the first logical element for a first period of time, the data mapping including data descriptive of relationships between the first device and the first logical element for the first period of time;
receiving data mapping the first device to the second logical element for a second period of time different from the first period of time, the data mapping including data descriptive of relationships between the first device and the second logical element for the second period of time;
receiving, from a user interface of the computer-based system, a request for information related to power usage for at least one of the first logical element and the second logical element over a period of time spanning the first period of time and the second period of time;
determining, in response to receiving the request for information related to power usage for the first logical element, power usage for the first logical element using one or more values of the first measured characteristic recorded during the first period of time and not using one or more values of the first measured characteristic recorded during the second period of time; and
using information related to the power usage of the first logical element to track power usage of the power system and provide information on resource use and availability.

14. The method of claim 13, further comprising illustrating the relationships between the first device and the first logical element for the first period of time, and the relationships between the first device and the second logical element for the second period of time, in the user interface, in response to receiving the receiving the data mapping the first device to the first logical element for the first period of time and the data mapping the first device to the second logical element for the second period of time.

15. The method of claim 13, wherein the data descriptive of the plurality of device elements includes data descriptive of a second device different from the first device, the data descriptive of the plurality of measured characteristics includes data descriptive of a second measured characteristic of the second device, and the method further comprises: receiving data mapping the second device to the first logical element for the second period of time; receiving data mapping the second device to the second logical element for the first period of time; determining, in response to receiving the request for information related to power usage for the second logical element, power usage for the second logical element using one or more values of the second measured characteristic recorded during the first period of time and using the one or more values of the first measured characteristic recorded during the second period of time; and using information related to the power usage of the second logical element to track power usage of the power system and provide information on resource use and availability.

16. The method of claim 15, wherein the data descriptive of the plurality of logical elements includes data descriptive of a third logical element different from the first logical element and the second logical element, and the method further comprises: receiving data linking the first logical element and the second logical element to the third logical element; receiving, from the user interface, a request for information related to power usage for the third logical element over a period of time spanning the first period of time and the second period of time; determining, in response to the request for information related to power usage for the third logical element, power usage for the third logical element using the one or more values of the first measured characteristic recorded during the first period of time, using the one or more values of the first measured characteristic recorded during the second period of time, using the one or more values of the second measured characteristic recorded during the first period of time, and using one or more values of the second measured characteristic recorded during the second period of time; and using information related to the power usage of the third logical element to track power usage of the power system and provide information on resource use and availability.

17. The method of claim 16, further comprising presenting the information related to the power usage of the first logical element, the second logical element, and the third logical element in the user interface.

18. The method of claim 13, wherein the plurality of device elements include a plurality of power system devices and wherein receiving data descriptive of the plurality of device elements includes receiving data descriptive of the plurality of power system devices.

19. The method of claim 18, wherein receiving the data descriptive of a plurality of device elements includes receiving data descriptive of a plurality of meters, receiving the data mapping the first device to the first logical element includes receiving data identifying a circuit, receiving the data mapping the first device to the second logical element includes receiving data identifying the circuit, and receiving data linking the first logical element and the second logical element to the third logical element includes receiving data identifying a rack.

* * * * *